(12) United States Patent
Bodin et al.

(10) Patent No.: US 9,318,100 B2
(45) Date of Patent: Apr. 19, 2016

(54) SUPPLEMENTING AUDIO RECORDED IN A MEDIA FILE

(75) Inventors: William K. Bodin, Austin, TX (US);
David Jaramillo, Lake Worth, FL (US);
Jesse W. Redman, Cedar Park, TX (US);
Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1976 days.

(21) Appl. No.: 11/619,216

(22) Filed: Jan. 3, 2007

(65) Prior Publication Data
US 2008/0161948 A1    Jul. 3, 2008

(51) Int. Cl.
| | |
|---|---|
| *G06F 17/00* | (2006.01) |
| *G10L 13/00* | (2006.01) |
| *G06F 17/30* | (2006.01) |
| *H04M 3/53* | (2006.01) |
| *G10L 15/26* | (2006.01) |

(52) U.S. Cl.
CPC .......... *G10L 13/00* (2013.01); *G06F 17/30746* (2013.01); *G06F 17/30749* (2013.01); *G06F 17/30758* (2013.01); *G10L 15/26* (2013.01); *H04M 3/5307* (2013.01); *H04M 2201/60* (2013.01)

(58) Field of Classification Search
CPC ................... G06F 17/30746; G06F 17/30749; G06F 17/30758; G10L 13/00; G10L 15/26; H04M 2201/60; H04M 3/5307
USPC ....... 700/94; 715/200–204; 704/235
See application file for complete search history.

(56) References Cited

U.S. PATENT DOCUMENTS

| | | | |
|---|---|---|---|
| 4,785,408 | A | 11/1988 | Britton |
| 5,341,469 | A | 8/1994 | Rossberg |
| 5,377,354 | A | 12/1994 | Scannell |
| 5,564,043 | A | 10/1996 | Siefert |
| 5,566,291 | A | 10/1996 | Boulton et al. |
| 5,613,032 | A | 3/1997 | Cruz et al. |
| 5,715,370 | A | 2/1998 | Luther |
| 5,732,216 | A | 3/1998 | Logan |
| 5,774,131 | A | 6/1998 | Kim |
| 5,819,220 | A | 10/1998 | Sarukkai et al. |
| 5,884,266 | A | 3/1999 | Dvorak |
| 5,890,117 | A | 3/1999 | Silverman |

(Continued)

FOREIGN PATENT DOCUMENTS

| | | |
|---|---|---|
| CN | 1123075 | 5/1996 |
| CN | 1298173 | 6/2001 |

(Continued)

OTHER PUBLICATIONS

ID3 draft specification copyright 2000.*

(Continued)

*Primary Examiner* — Paul McCord
(74) *Attorney, Agent, or Firm* — Brevetto Law Group

(57) ABSTRACT

Methods, systems, and computer program products are provided for supplementing audio recorded in a media file. Embodiments include receiving a media file; identifying the subject matter of audio portion of the media file; identifying supplemental content for supplementing the subject matter recorded in the audio portion of the media file; and inserting in the media file markup for rendering the supplemental content.

21 Claims, 8 Drawing Sheets

(56) References Cited

U.S. PATENT DOCUMENTS

| | | |
|---|---|---|
| 5,892,825 A | 4/1999 | Mages et al. |
| 5,901,287 A | 5/1999 | Bull et al. |
| 5,903,727 A | 5/1999 | Nielsen |
| 5,911,776 A | 6/1999 | Guck |
| 5,978,463 A | 11/1999 | Jurkevics |
| 6,006,187 A | 12/1999 | Tanenblatt |
| 6,012,098 A | 1/2000 | Bayeh et al. |
| 6,029,135 A | 2/2000 | Krasle |
| 6,032,260 A | 2/2000 | Sasmazel et al. |
| 6,044,347 A | 3/2000 | Abella |
| 6,055,525 A | 4/2000 | Nusbickel |
| 6,064,961 A | 5/2000 | Hanson |
| 6,088,026 A | 7/2000 | Williams |
| 6,092,121 A | 7/2000 | Bennett |
| 6,115,482 A | 9/2000 | Sears et al. |
| 6,115,686 A | 9/2000 | Chung |
| 6,141,693 A | 10/2000 | Perlman et al. |
| 6,178,511 B1 | 1/2001 | Cohen et al. |
| 6,199,076 B1 | 3/2001 | Logan |
| 6,233,318 B1 | 5/2001 | Picard |
| 6,240,391 B1 | 5/2001 | Ball et al. |
| 6,266,649 B1 | 7/2001 | Linden et al. |
| 6,272,461 B1 | 8/2001 | Meredith et al. |
| 6,282,511 B1 | 8/2001 | Mayer |
| 6,282,512 B1 | 8/2001 | Hemphill |
| 6,311,194 B1 | 10/2001 | Sheth et al. |
| 6,317,714 B1 | 11/2001 | Del Castillo |
| 6,324,511 B1 | 11/2001 | Kiraly et al. |
| 6,397,185 B1 | 5/2002 | Komissarchik et al. |
| 6,463,440 B1 | 10/2002 | Hind et al. |
| 6,468,084 B1 | 10/2002 | MacMillan |
| 6,480,860 B1 | 11/2002 | Monday |
| 6,510,413 B1 | 1/2003 | Walker |
| 6,519,617 B1 | 2/2003 | Wanderski et al. |
| 6,532,477 B1 | 3/2003 | Tang |
| 6,563,770 B1 | 5/2003 | Kokhab |
| 6,568,939 B1 | 5/2003 | Edgar |
| 6,574,599 B1 | 6/2003 | Lim |
| 6,593,943 B1 | 7/2003 | MacPhail |
| 6,594,637 B1 | 7/2003 | Furukawa |
| 6,604,076 B1 | 8/2003 | Holley |
| 6,611,876 B1 | 8/2003 | Barrett |
| 6,644,973 B2 | 11/2003 | Oster |
| 6,684,370 B1 | 1/2004 | Sikorsky |
| 6,687,678 B1 | 2/2004 | Yorimatsu |
| 6,731,993 B1 | 5/2004 | Carter |
| 6,771,743 B1 | 8/2004 | Butler et al. |
| 6,792,407 B2 | 9/2004 | Kibre |
| 6,802,041 B1 | 10/2004 | Rehm |
| 6,810,146 B2 | 10/2004 | Loui et al. |
| 6,832,196 B2 | 12/2004 | Reich |
| 6,839,669 B1 | 1/2005 | Gould |
| 6,859,527 B1 | 2/2005 | Banks |
| 6,901,403 B1 | 5/2005 | Bata |
| 6,912,691 B1 | 6/2005 | Dodrill et al. |
| 6,931,587 B1 | 8/2005 | Krause |
| 6,944,214 B1 | 9/2005 | Gilbert |
| 6,944,591 B1 | 9/2005 | Raghunandan |
| 6,965,569 B1 | 11/2005 | Carolan et al. |
| 6,976,082 B1 | 12/2005 | Ostermann et al. |
| 6,990,451 B2 | 1/2006 | Case et al. |
| 6,992,451 B2 | 1/2006 | Kamio |
| 6,993,476 B1 | 1/2006 | Dutta et al. |
| 7,017,120 B2 | 3/2006 | Shnier |
| 7,031,477 B1 | 4/2006 | Mella |
| 7,039,643 B2 | 5/2006 | Sena et al. |
| 7,046,772 B1 | 5/2006 | Moore et al. |
| 7,054,818 B2 | 5/2006 | Sharma |
| 7,062,437 B2 | 6/2006 | Kovales et al. |
| 7,065,222 B2 | 6/2006 | Wilcock |
| 7,069,092 B2 | 6/2006 | Wiser |
| 7,096,183 B2 | 8/2006 | Junqua |
| 7,107,281 B2 | 9/2006 | De La Huerga |
| 7,113,909 B2 | 9/2006 | Nukaga |
| 7,120,702 B2 | 10/2006 | Huang et al. |
| 7,130,850 B2 | 10/2006 | Russell-Falla et al. |
| 7,139,713 B2 | 11/2006 | Falcon |
| 7,149,694 B1 | 12/2006 | Harb |
| 7,149,810 B1 | 12/2006 | Miller |
| 7,162,502 B2 | 1/2007 | Suarez |
| 7,171,411 B1 | 1/2007 | Lewis et al. |
| 7,178,100 B2 | 2/2007 | Call |
| 7,191,133 B1 | 3/2007 | Pettay |
| 7,313,528 B1 | 12/2007 | Miller |
| 7,346,649 B1 | 3/2008 | Wong |
| 7,346,844 B1 * | 3/2008 | Baer et al. ................ 715/708 |
| 7,349,949 B1 | 3/2008 | Connor |
| 7,356,470 B2 | 4/2008 | Roth et al. |
| 7,366,712 B2 | 4/2008 | He et al. |
| 7,369,988 B1 | 5/2008 | Thenthiruperai |
| 7,386,575 B2 | 6/2008 | Bashant |
| 7,392,102 B2 | 6/2008 | Sullivan |
| 7,430,510 B1 | 9/2008 | De Fabbrizio |
| 7,433,819 B2 | 10/2008 | Adams et al. |
| 7,437,408 B2 | 10/2008 | Schwartz |
| 7,454,346 B1 | 11/2008 | Dodrill et al. |
| 7,542,903 B2 | 6/2009 | Azara et al. |
| 7,552,055 B2 | 6/2009 | Lecoeuche |
| 7,561,932 B1 | 7/2009 | Holmes |
| 7,568,213 B2 | 7/2009 | Carhart |
| 7,657,006 B2 | 2/2010 | Woodring |
| 7,664,641 B1 | 2/2010 | Pettay et al. |
| 7,685,525 B2 | 3/2010 | Kumar |
| 7,729,478 B1 | 6/2010 | Coughlan et al. |
| 7,756,934 B2 * | 7/2010 | Silver et al. ................ 709/206 |
| 7,827,259 B2 * | 11/2010 | Heller et al. ................ 709/223 |
| 7,873,520 B2 | 1/2011 | Paik |
| 7,890,517 B2 | 2/2011 | Angelo |
| 8,321,041 B2 * | 11/2012 | Jellison et al. ................ 700/94 |
| 2001/0014146 A1 | 8/2001 | Beyda |
| 2001/0027396 A1 | 10/2001 | Sato |
| 2001/0040900 A1 | 11/2001 | Salmi |
| 2001/0047349 A1 | 11/2001 | Easty |
| 2001/0049725 A1 | 12/2001 | Kosuge |
| 2001/0054074 A1 | 12/2001 | Hayashi |
| 2002/0013708 A1 | 1/2002 | Walker et al. |
| 2002/0015480 A1 | 2/2002 | Daswani |
| 2002/0032564 A1 | 3/2002 | Ehsani et al. |
| 2002/0032776 A1 | 3/2002 | Hasegawa et al. |
| 2002/0039426 A1 | 4/2002 | Takemoto |
| 2002/0054090 A1 | 5/2002 | Silva et al. |
| 2002/0057678 A1 | 5/2002 | Jiang |
| 2002/0062216 A1 | 5/2002 | Guenther et al. |
| 2002/0062393 A1 | 5/2002 | Borger et al. |
| 2002/0083013 A1 | 6/2002 | Rollins et al. |
| 2002/0095292 A1 | 7/2002 | Mittal et al. |
| 2002/0120451 A1 | 8/2002 | Kato et al. |
| 2002/0120693 A1 | 8/2002 | Rudd |
| 2002/0128837 A1 | 9/2002 | Morin |
| 2002/0130891 A1 | 9/2002 | Singer |
| 2002/0143414 A1 | 10/2002 | Wilcock |
| 2002/0151998 A1 | 10/2002 | Kemppi |
| 2002/0152210 A1 | 10/2002 | Johnson et al. |
| 2002/0169770 A1 | 11/2002 | Kim |
| 2002/0173964 A1 | 11/2002 | Reich |
| 2002/0178007 A1 | 11/2002 | Slotznick et al. |
| 2002/0193894 A1 | 12/2002 | Terada |
| 2002/0194286 A1 | 12/2002 | Matsuura et al. |
| 2002/0194480 A1 | 12/2002 | Nagao |
| 2002/0198714 A1 | 12/2002 | Zhou |
| 2002/0198720 A1 | 12/2002 | Takagi et al. |
| 2003/0018727 A1 | 1/2003 | Yamamoto |
| 2003/0028380 A1 | 2/2003 | Freeland et al. |
| 2003/0033331 A1 | 2/2003 | Sena et al. |
| 2003/0034879 A1 * | 2/2003 | Rangarajan et al. ......... 340/7.56 |
| 2003/0055835 A1 | 3/2003 | Roth |
| 2003/0055868 A1 | 3/2003 | Fletcher et al. |
| 2003/0078780 A1 | 4/2003 | Kochanski et al. |
| 2003/0103606 A1 | 6/2003 | Rhie et al. |
| 2003/0108184 A1 | 6/2003 | Brown |
| 2003/0110185 A1 | 6/2003 | Rhoads |
| 2003/0110272 A1 | 6/2003 | du Castel et al. |
| 2003/0110297 A1 | 6/2003 | Tabatabai et al. |
| 2003/0115056 A1 | 6/2003 | Gusler et al. |

(56) References Cited

U.S. PATENT DOCUMENTS

| | | |
|---|---|---|
| 2003/0115064 A1 | 6/2003 | Gusler et al. |
| 2003/0115289 A1 | 6/2003 | Chinn |
| 2003/0126293 A1 | 7/2003 | Bushey |
| 2003/0132953 A1 | 7/2003 | Johnson et al. |
| 2003/0145062 A1 | 7/2003 | Sharma |
| 2003/0151618 A1 | 8/2003 | Johnson |
| 2003/0156130 A1 | 8/2003 | James |
| 2003/0158737 A1 | 8/2003 | Csicsatka |
| 2003/0160770 A1 | 8/2003 | Zimmerman |
| 2003/0163211 A1 | 8/2003 | Van Der Meulen |
| 2003/0167234 A1 | 9/2003 | Bodmer et al. |
| 2003/0172066 A1 | 9/2003 | Cooper et al. |
| 2003/0182000 A1 | 9/2003 | Muesch |
| 2003/0182124 A1 | 9/2003 | Khan |
| 2003/0187668 A1 | 10/2003 | Ullmann |
| 2003/0187726 A1 | 10/2003 | Bull |
| 2003/0188255 A1* | 10/2003 | Shimizu et al. ............ 715/501.1 |
| 2003/0212654 A1 | 11/2003 | Harper |
| 2003/0225599 A1 | 12/2003 | Mueller |
| 2003/0229847 A1* | 12/2003 | Kim ...................... 715/501.1 |
| 2004/0003394 A1 | 1/2004 | Ramaswamy |
| 2004/0027859 A1 | 2/2004 | Ohtani |
| 2004/0034653 A1 | 2/2004 | Maynor et al. |
| 2004/0041835 A1 | 3/2004 | Lu |
| 2004/0044665 A1 | 3/2004 | Nwabueze |
| 2004/0049477 A1 | 3/2004 | Powers |
| 2004/0067472 A1 | 4/2004 | Polanyi et al. |
| 2004/0068552 A1 | 4/2004 | Kotz et al. |
| 2004/0088063 A1 | 5/2004 | Hoshi |
| 2004/0088349 A1 | 5/2004 | Beck et al. |
| 2004/0093350 A1 | 5/2004 | Alexander |
| 2004/0107125 A1 | 6/2004 | Guheen |
| 2004/0120479 A1 | 6/2004 | Creamer |
| 2004/0128276 A1 | 7/2004 | Scanlon |
| 2004/0143430 A1 | 7/2004 | Said |
| 2004/0153178 A1 | 8/2004 | Koch |
| 2004/0172254 A1 | 9/2004 | Sharma |
| 2004/0199375 A1 | 10/2004 | Ehsani et al. |
| 2004/0201609 A1 | 10/2004 | Obrador |
| 2004/0210626 A1 | 10/2004 | Bodin |
| 2004/0225499 A1 | 11/2004 | Wang |
| 2004/0254851 A1 | 12/2004 | Himeno et al. |
| 2004/0267387 A1 | 12/2004 | Samadani |
| 2004/0267774 A1 | 12/2004 | Lin et al. |
| 2005/0004992 A1 | 1/2005 | Horstmann |
| 2005/0015254 A1 | 1/2005 | Bearman |
| 2005/0015718 A1 | 1/2005 | Sambhus |
| 2005/0021826 A1 | 1/2005 | Kumar |
| 2005/0043940 A1 | 2/2005 | Elder |
| 2005/0045373 A1 | 3/2005 | Born |
| 2005/0065625 A1 | 3/2005 | Sass |
| 2005/0071780 A1 | 3/2005 | Muller et al. |
| 2005/0076365 A1 | 4/2005 | Popov et al. |
| 2005/0088981 A1 | 4/2005 | Woodruff et al. |
| 2005/0108521 A1 | 5/2005 | Silhavy et al. |
| 2005/0114139 A1 | 5/2005 | Dincer |
| 2005/0119894 A1 | 6/2005 | Cutler et al. |
| 2005/0120083 A1 | 6/2005 | Aizawa |
| 2005/0137875 A1 | 6/2005 | Kim |
| 2005/0138063 A1 | 6/2005 | Bazot |
| 2005/0144002 A1 | 6/2005 | Ps |
| 2005/0152344 A1 | 7/2005 | Chiu |
| 2005/0154580 A1 | 7/2005 | Horowitz |
| 2005/0154969 A1 | 7/2005 | Bodin |
| 2005/0190897 A1 | 9/2005 | Eberle |
| 2005/0195999 A1 | 9/2005 | Takemura |
| 2005/0203887 A1 | 9/2005 | Joshi |
| 2005/0203959 A1 | 9/2005 | Muller et al. |
| 2005/0203960 A1 | 9/2005 | Suarez |
| 2005/0232242 A1 | 10/2005 | Karaoguz et al. |
| 2005/0234727 A1 | 10/2005 | Chiu |
| 2005/0251513 A1 | 11/2005 | Tenazas |
| 2005/0261905 A1 | 11/2005 | Pyo et al. |
| 2005/0262119 A1 | 11/2005 | Mawdsley |
| 2005/0288926 A1 | 12/2005 | Benco |
| 2006/0008252 A1 | 1/2006 | Kim |
| 2006/0008258 A1 | 1/2006 | Kawana |
| 2006/0020662 A1 | 1/2006 | Robinson |
| 2006/0031447 A1 | 2/2006 | Holt |
| 2006/0041549 A1 | 2/2006 | Gundersen |
| 2006/0048212 A1 | 3/2006 | Tsuruoka et al. |
| 2006/0050794 A1 | 3/2006 | Tan et al. |
| 2006/0050996 A1 | 3/2006 | King |
| 2006/0052089 A1 | 3/2006 | Khurana et al. |
| 2006/0075224 A1 | 4/2006 | Tao |
| 2006/0085199 A1 | 4/2006 | Jain |
| 2006/0095848 A1 | 5/2006 | Naik |
| 2006/0100877 A1 | 5/2006 | Zhang et al. |
| 2006/0112844 A1 | 6/2006 | Hiller |
| 2006/0114987 A1* | 6/2006 | Roman ................ 375/240.01 |
| 2006/0123082 A1 | 6/2006 | Digate et al. |
| 2006/0129403 A1 | 6/2006 | Liao et al. |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0165104 A1 | 7/2006 | Kaye |
| 2006/0168507 A1 | 7/2006 | Hansen |
| 2006/0173985 A1 | 8/2006 | Moore |
| 2006/0184679 A1 | 8/2006 | Izdepski et al. |
| 2006/0190616 A1 | 8/2006 | Mayerhofer et al. |
| 2006/0193450 A1 | 8/2006 | Flynt |
| 2006/0200743 A1 | 9/2006 | Thong |
| 2006/0206533 A1 | 9/2006 | MacLaurin et al. |
| 2006/0224739 A1 | 10/2006 | Anantha |
| 2006/0233327 A1 | 10/2006 | Roberts et al. |
| 2006/0242663 A1 | 10/2006 | Gogerty |
| 2006/0253699 A1 | 11/2006 | Della-Libera |
| 2006/0265503 A1 | 11/2006 | Jones et al. |
| 2006/0282317 A1 | 12/2006 | Rosenberg |
| 2006/0282822 A1 | 12/2006 | Weng |
| 2006/0287745 A1 | 12/2006 | Richenstein |
| 2006/0288011 A1 | 12/2006 | Gandhi et al. |
| 2007/0005339 A1 | 1/2007 | Jaquinta |
| 2007/0027692 A1 | 2/2007 | Sharma |
| 2007/0027958 A1 | 2/2007 | Haslam |
| 2007/0043462 A1 | 2/2007 | Nakayama |
| 2007/0043735 A1 | 2/2007 | Bodin |
| 2007/0043758 A1 | 2/2007 | Bodin |
| 2007/0043759 A1 | 2/2007 | Bodin et al. |
| 2007/0061132 A1 | 3/2007 | Bodin |
| 2007/0061229 A1 | 3/2007 | Ramer et al. |
| 2007/0061266 A1 | 3/2007 | Moore et al. |
| 2007/0061371 A1 | 3/2007 | Bodin |
| 2007/0061401 A1 | 3/2007 | Bodin |
| 2007/0061711 A1 | 3/2007 | Bodin |
| 2007/0061712 A1 | 3/2007 | Bodin |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundia et al. |
| 2007/0091206 A1 | 4/2007 | Bloebaum |
| 2007/0100628 A1 | 5/2007 | Bodin |
| 2007/0100629 A1 | 5/2007 | Bodin |
| 2007/0100787 A1 | 5/2007 | Lim |
| 2007/0100836 A1 | 5/2007 | Eichstaedt et al. |
| 2007/0101274 A1 | 5/2007 | Kurlander |
| 2007/0101313 A1 | 5/2007 | Bodin |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0138999 A1 | 6/2007 | Lee |
| 2007/0147274 A1 | 6/2007 | Vasa et al. |
| 2007/0165538 A1 | 7/2007 | Bodin |
| 2007/0168191 A1 | 7/2007 | Bodin |
| 2007/0168194 A1 | 7/2007 | Bodin |
| 2007/0174326 A1 | 7/2007 | Schwartz et al. |
| 2007/0174388 A1* | 7/2007 | Williams ................ 709/204 |
| 2007/0191008 A1 | 8/2007 | Bucher et al. |
| 2007/0192327 A1 | 8/2007 | Bodin |
| 2007/0192672 A1 | 8/2007 | Bodin |

(56) References Cited

U.S. PATENT DOCUMENTS

| | | | |
|---|---|---|---|
| 2007/0192673 A1 | 8/2007 | Bodin | |
| 2007/0192674 A1 | 8/2007 | Bodin | |
| 2007/0192675 A1 | 8/2007 | Bodin | |
| 2007/0192676 A1 | 8/2007 | Bodin | |
| 2007/0192683 A1 | 8/2007 | Bodin | |
| 2007/0192684 A1 | 8/2007 | Bodin et al. | |
| 2007/0198267 A1 | 8/2007 | Jones | |
| 2007/0208687 A1 | 9/2007 | O'Connor et al. | |
| 2007/0213857 A1 | 9/2007 | Bodin | |
| 2007/0213986 A1 | 9/2007 | Bodin | |
| 2007/0214147 A1 | 9/2007 | Bodin et al. | |
| 2007/0214148 A1 | 9/2007 | Bodin | |
| 2007/0214149 A1 | 9/2007 | Bodin | |
| 2007/0214485 A1 | 9/2007 | Bodin | |
| 2007/0220024 A1 | 9/2007 | Putterman et al. | |
| 2007/0239837 A1 | 10/2007 | Jablokov | |
| 2007/0253699 A1 | 11/2007 | Yen et al. | |
| 2007/0276837 A1 | 11/2007 | Bodin et al. | |
| 2007/0276865 A1 | 11/2007 | Bodin et al. | |
| 2007/0276866 A1 | 11/2007 | Bodin et al. | |
| 2007/0277088 A1 | 11/2007 | Bodin | |
| 2007/0277233 A1 | 11/2007 | Bodin | |
| 2008/0034278 A1 | 2/2008 | Tsou et al. | |
| 2008/0052415 A1 | 2/2008 | Kellerman et al. | |
| 2008/0082576 A1 | 4/2008 | Bodin | |
| 2008/0082635 A1 | 4/2008 | Bodin | |
| 2008/0155616 A1 | 6/2008 | Logan | |
| 2008/0161948 A1 | 7/2008 | Bodin | |
| 2008/0162131 A1 | 7/2008 | Bodin | |
| 2008/0162559 A1 | 7/2008 | Bodin | |
| 2008/0275893 A1 | 11/2008 | Bodin et al. | |
| 2009/0271178 A1 | 10/2009 | Bodin | |
| 2010/0223223 A1* | 9/2010 | Sandler et al. | 706/50 |

FOREIGN PATENT DOCUMENTS

| | | |
|---|---|---|
| CN | 1368719 A | 9/2002 |
| EP | 1197884 | 4/2002 |
| GB | 236995 | 12/2002 |
| KR | 20010071517 | 7/2001 |
| KR | 20040078888 | 9/2004 |
| WO | WO 0182139 | 11/2001 |
| WO | WO 2005/106846 | 11/2005 |

OTHER PUBLICATIONS

Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.
Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.
Text to Speech MP3 with Natural Voices 1.71, Published Oct. 5, 2004.
Managing multimedia content and delivering services across multiple client platforms using XML, London Communications Symposium, xx, xx, Sep. 10, 2002, pp. 1-7.
PCT Search Report and Written Opinion International Application PCT/EP2007/050594.
U.S. Appl. No. 11/352,760, filed Feb. 2006, Bodin, et al.
U.S. Appl. No. 11/352,824, filed Feb. 2006, Bodin, et al.
U.S. Appl. No. 11/352,680, filed Feb. 2006, Bodin, et al.
U.S. Appl. No. 11/352,679, filed Feb. 2006, Bodin et al.
U.S. Appl. No. 11/372,323, filed Mar. 2006, Bodin et al.
U.S. Appl. No. 11/372,318, filed Mar. 2006, Bodin et al.
U.S. Appl. No. 11/372,319, filed Mar. 2006, Bodin et al.
U.S. Appl. No. 11/536,781, filed Sep. 2006, Bodin et al.
U.S. Appl. No. 11/420,014, filed May 2006, Bodin et al.
U.S. Appl. No. 11/420,015, filed May 2006, Bodin et al.
U.S. Appl. No. 11/420,016, filed May 2006, Bodin et al.
U.S. Appl. No. 11/420,017, filed May 2006, Bodin et al.
U.S. Appl. No. 11/420,018, filed May 2006, Bodin et al.
U.S. Appl. No. 11/536,733, filed Sep. 2006, Bodin et al.
U.S. Appl. No. 11/619,216, filed Jan. 2007, Bodin et al.
U.S. Appl. No. 11/619,253, filed Jan. 2007, Bodin, et al.
U.S. Appl. No. 12/178,448, filed Jul. 2008, Bodin, et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.
Final Office Action Dated Jul. 9, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.
Buchana et al., "Representing Aggregated Works in the Digital Library", ACM, 2007, pp. 247-256.
Office Action, U.S. Appl. No. 11/352,760, Sep. 16, 2010.
Office Action, U.S. Appl. No. 11/352,680, Jun. 10, 2010.
Final Office Action, U.S. Appl. No. 11/352,680, Sep. 7, 2010.
Office Action, U.S. Appl. No. 11/352,679, May 28, 2010.
Final Office Action, U.S. Appl. No. 11/352,679, Nov. 15, 2010.
Office Action, U.S. Appl. No. 11/372,317, Sep. 23, 2010.
Final Office Action, U.S. Appl. No. 11/372,329, Nov. 6, 2009.
Office Action, U.S. Appl. No. 11/372,319, Apr. 21, 2010.
Final Office Action, U.S. Appl. No. 11/372,319, Jul. 2, 2010.
Final Office Action, U.S. Appl. No. 11/420,014, Apr. 3, 2010.
Final Office Action, U.S. Appl. No. 11/420,017, Sep. 23, 2010.
Final Office Action, U.S. Appl. No. 11/619,216, Jun. 25, 2010.
Final Office Action, U.S. Appl. No. 11/619,236, Oct. 22, 2010.
Office Action, U.S. Appl. No. 12/178,448, Apr. 2, 2010.
Final Office Action, U.S. Appl. No. 12/178,448, Sep. 14, 2010.
Babara et al.; "The Audio Web"; Bell Communications Research; NJ; USA; pp. 97-104; 1997.
Monahan et al.; "Adapting Multimedia Internet Content for Universal Access"; IEEE Transactions on Multimedia, vol. 1, No. 1; pp. 104-114; 1999.

(56) References Cited

OTHER PUBLICATIONS

Lu et al.; "Audio Ticker"; Computer Networks and ISDN Systems, vol. 30, Issue 7, pp. 721-722, Apr. 1998.
U.S. Appl. No. 11/352,698 Office Action mailed Apr. 29, 2009.
Advertisement of EastBay Technologies, San Jose, CA; (author unknown); "IM Speak, Text to Speech Instant Messages"; from http://www.eastbaytech.com/im.htm website; Dec. 2005.
Advertisement of Odiogo, Inc. 410 Park Avenue, 15th floor, New York City, NY; (author unknown); "Create Text-To-Speech Podcast from RSS Feed with ODiofo for iPod, MP3 Player and Mobile Phone"; website; pp. 1-2; Dec. 13, 2006.
FeedForAll. Hanover, MA; (author unknown); "iTune Tutorial Tags"; from www.feedforall.com website; pp. 1-9; Jul. 11, 2006.
U.S. Appl. No. 11/331,692 Office Action mailed Aug. 17, 2009.
Advertisement of Audioblog.com Audio Publishing Services, Flower Mound, Texas; (author unknown); "Service Features"; from www.audioblog.com website; pp. 1-2; Sep. 23, 2004.
Zhang et al.; "XML-Based Advanced UDDI Search Mechanism for B2B Integration", Electronic Commerce Research, vol. 3, Nos. 1-2, 25-42, DOI: 10.1023/A:1021573226353; Kluwer Academic Publishers, The Netherlands, 2003.
Tian He et al., University of Virginia, Charlottesville, VA; "AIDA: Adaptive Application-Independent Data Aggregation in Wireless Sensor Networks" pp. 426-429, 432-449, and, 451-457; 2003.
Braun et al.; Fraunhofer Institute for Computer Graphics, Darmstadt, DE; ICAD 1998 "Using Sonic Hyperlinks in Web-TV"; pp. 1-10; 1998.
Braun et al.; IEEE Computer Society, Washington, DC; "Temporal Hypermedia for Multimedia Applications in the World Wide Web"; pp. 1-5; 1999.
Frankie, James, Computer Science Department, Stanford University; "AHA:Audio HTML Access"; pp. 1-13; 2007.
International Business Machines Corporation; PCT Search Report; Sep. 2, 2007; PCT Application No. PCT/EP2007/051260.
Hoschka, et al; "Synchronized Multimedia Integration Language (SMIL) 1.0 Specification"; pp. 1-43; found at website http://www.w3.org/TR/1998/PR-smil-19980409; Apr. 9, 1998.
Casalaina et al., "BMRC Procedures: RealMedia Guide"; pp. 1-7; Berkeley Multimedia Research Center, Berkeley, CA; found at http://web.archive.org/web/20030218131051/http://bmrc.berkeley.edu/info/procedures/rm.html; Feb. 13, 1998.
Advertisement of TextToSpeechMP3.com; "Text to Speech MP3 with Natural Voices 1.71"; (author unknown); website; pp. 1-5; 2004; London.
Andrade et al.; "Managing Multimedia Content and Delivering Services Across Multiple Client Platforms using XML"; Symposium; London Communications; London; pp. 1-8; 2002.
International Business Machines Corporation; PCT Search Report; Mar. 27, 2007; Application No. PCT/EP2007/050594.
U.S. Appl. No. 11/352,710 Office Action mailed Jun. 11, 2009.
U.S. Appl. No. 11/352,727 Office Action mailed May 19, 2009.
U.S. Appl. No. 11/266,559 Final Office Action mailed Apr. 20, 2009.
U.S. Appl. No. 11/266,662 Final Office Action mailed Oct. 30, 2008.
U.S. Appl. No. 11/266,675 Final Office Action mailed Apr. 6, 2009.
U.S. Appl. No. 11/266,698 Final Office Action mailed Dec. 19, 2008.
U.S. Appl. No. 11/352,709 Office Action mailed May 14, 2009.
U.S. Appl. No. 11/207,911 Final Office Action mailed Apr. 29, 2008.
U.S. Appl. No. 11/207,911 Final Office Action mailed Apr. 15, 2009.
U.S. Appl. No. 11/226,747 Final Office Action mailed Sep. 25, 2008.
U.S. Appl. No. 11/266,744 Final Office Action mailed May 7, 2008.
U.S. Appl. No. 11/207,912 Final Office Action mailed May 7, 2008.
U.S. Appl. No. 11/207,912 Final Office Action mailed Apr. 28, 2009.
U.S. Appl. No. 11/266,663 Final Office Action mailed Sep. 16, 2008.
U.S. Appl. No. 11/331,694 Final Office Action mailed Mar. 30, 2009.
U.S. Appl. No. 11/331,692 Final Office Action mailed Feb. 9, 2009.
U.S. Appl. No. 11/207,914 Final Office Action mailed May 7, 2008.
U.S. Appl. No. 11/207,914 Final Office Action mailed Apr. 14, 2009.
U.S. Appl. No. 11/207,913 Final Office Action mailed Dec. 23, 2008.
U.S. Appl. No. 11/226,746 Final Office Action mailed Sep. 15, 2008.
U.S. Appl. No. 11/207,912 Office Action mailed Jan. 25, 2010.
U.S. Appl. No. 11/207,911 Notice of Allowance mailed Feb. 3, 2010.
U.S. Appl. No. 11/226,746 Final Office Action mailed Jul. 31, 2009.
U.S. Appl. No. 11/226,746 Office Action mailed Jan. 25, 2010.
U.S. Appl. No. 11/352,709 Final Office Action mailed Nov. 5, 2009.

* cited by examiner

SUPPLEMENTING AUDIO RECORDED IN A MEDIA FILE

BACKGROUND OF THE INVENTION

1. Field of the Invention

The field of the invention is data processing, or, more specifically, methods, systems, and products for supplementing audio recorded in a media file.

2. Description of Related Art

Managers are increasingly isolated from one another and their employees. One reason for this isolation is that managers are often time constrained and their communication occurs with many different devices and often communications requires two or more managers or employees to be available at the same time. There therefore is a need for improvement in communications among users such as managers and employees that reduces the devices used to communicate and reduces the requirement for more than one user to communicate at the same time.

SUMMARY OF THE INVENTION

Methods, systems, and computer program products are provided for supplementing audio recorded in a media file. Embodiments include receiving a media file; identifying the subject matter of audio portion of the media file; identifying supplemental content for supplementing the subject matter recorded in the audio portion of the media file; and inserting in the media file markup for rendering the supplemental content.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
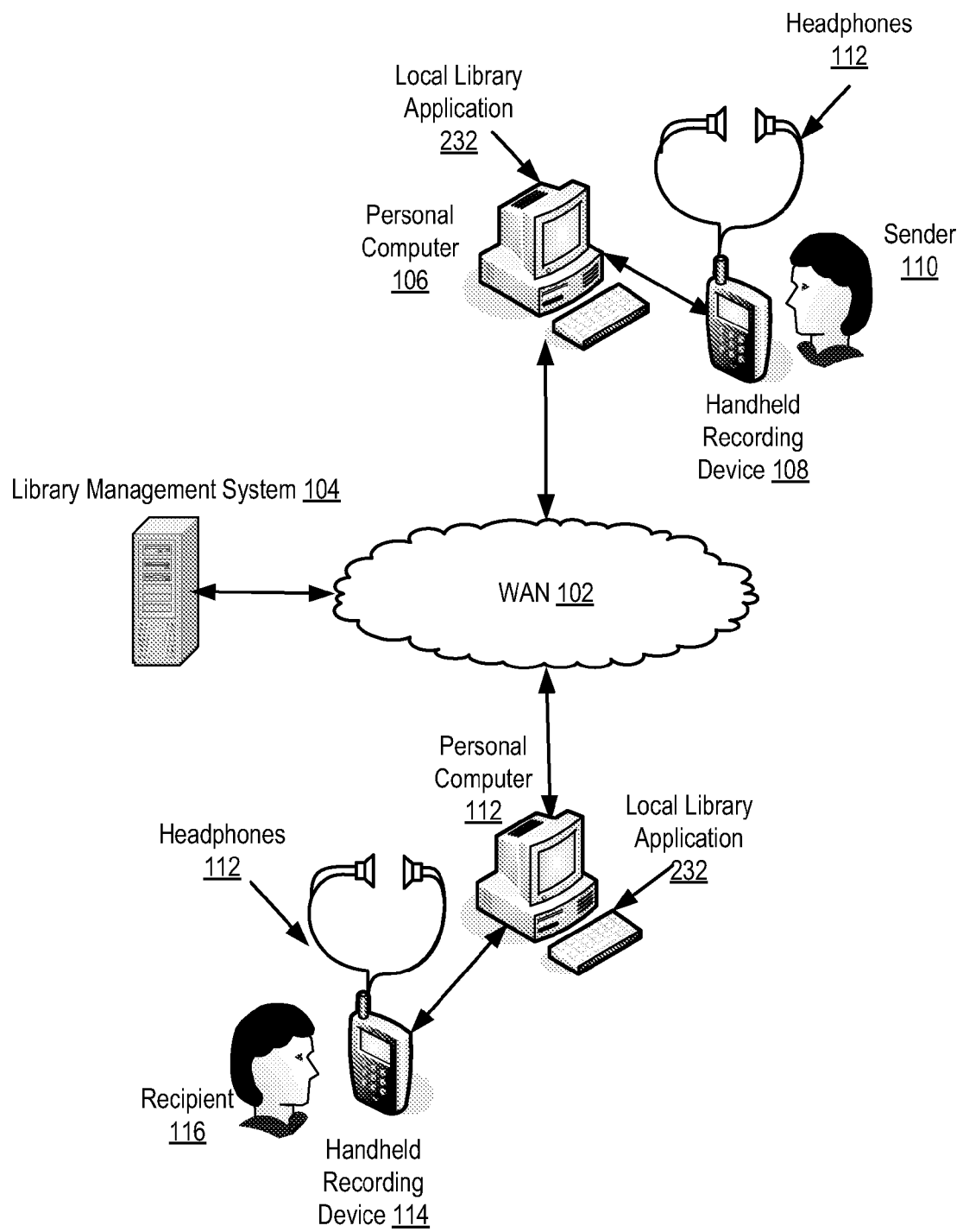
FIG. 1 sets forth a network diagram of a system for asynchronous communications using messages recorded on handheld devices according to embodiments of the present invention.

Exemplary methods, systems, and products for asynchronous communications and supplementing audio recorded in a media file according to the present invention are described with reference to the accompanying drawings, beginning with FIG. 1. FIG. 1 sets forth a network diagram of a system for asynchronous communications using messages recorded on handheld devices and for supplementing audio recorded in a media file according to the present invention according to embodiments of the present invention. Asynchronous communications means communications among parties that occurs with some time delay. Asynchronous communications according to the present invention may allow participants of communications to send, receive, and respond to communications at their own convenience with no requirement to be available simultaneously.

The system of FIG. 1 includes to personal computers (106 and 112) coupled for data communications to a wide area network ('WAN') (102). Each of the personal computers (106 and 112) of FIG. 1 has installed upon them a local library application (232). A local library application (232) includes computer program instructions capable of transferring media files containing recorded messages to a handheld recording device (108 and 114). The local library application (232) also includes computer program instructions capable of receiving media files containing messages from the handheld recording device (108 and 114) and transmitting the media files to a library management system (104).

The example of FIG. 1 also includes a library management system (104). The library management system of FIG. 1 is capable of asynchronous communications by receiving a recorded message having been recorded on a handheld device (108) converting the recorded message to text; identifying a recipient (116) of the message in dependence upon the text; associating the message with content under management by a library management system in dependence upon the text; and storing the message for transmission to another handheld device (114) for the recipient. The exemplary library management system (104) of FIG. 1 manages asynchronous communications using recorded messages according to the present invention, as well as additional content associated with those recorded messages. Such associated content under management include, for example, other recorded messages created by senders and recipients, emails, media files containing media content, spreadsheets, presentations, RSS ('Really Simple Syndication') feeds, web pages, and well as any other content that will occur to those of skill in the art. Maintaining the content as well as managing asynchronous communications relating to that content may provide tight coupling between the communications between users and the content related to those communications. Such tight coupling provides the ability to determine that content under management is the subject of the communications and therefore provide an identification of such content to a recipient. Such tight coupling also provides the ability to attach that content to the message providing together the content which is the subject of the communications and the communications themselves.

The library management system (104) of FIG. 1 is also capable of supplementing audio recorded in a media file by receiving a media file; identifying the subject matter of audio portion of the media file; identifying supplemental content for supplementing the subject matter recorded in the audio portion of the media file; and inserting in the media file markup for rendering the supplemental content. Supplementing audio recorded in a media file according to the present invention may improve the use and enjoyment of audio recorded on the media file.

The exemplary system of FIG. 1 is capable of asynchronous communications according to the present invention by recording a message from a sender (110) on handheld device (108). The handheld recording device of FIG. 1 includes a microphone for receiving speech of the message and is capable of recording the message in a media file. One handheld recording device useful according to embodiments of the present invention is the WP-U2J available from Samsung.

The exemplary system of FIG. 1 is capable of transferring the media file containing the recorded message from the handheld recording device (108) to a local library application (232). Media files containing one or messages may be transferred to the local library application by periodically synchronizing the handheld recording device with the local library application allowing a sender to begin transmission of the message at the convenience of the sender.

The exemplary system of FIG. 1 is also capable of transferring the media file containing the recorded message to a library management system (104). The library management system comprises computer program instructions capable of receiving a recorded message; converting the recorded message to text; identifying a recipient of the message in dependence upon the text; associating the message with content under management by a library management system in dependence upon the text; and storing the message for transmission to another handheld device for the recipient The exemplary system of FIG. 1 is also capable of transferring the media file containing the recorded message to a local library application (232) installed on a personal computer (112). The system of FIG. 1 is also capable of transmitting message to the handheld recording device (114) of the recipient (116) who may listen to the message using headphones (112) or speakers on the device. A recipient may transfer messages to the handheld device by synchronizing the handheld recording device with the local library application (232) allowing the recipient to obtain messages at the recipients convenience. The recipient may now respond to the sender in the same manner providing two way asynchronous communications between sender and recipient.

The handheld recording devices (108 and 114) of FIG. 1 are also useful in supplementing audio recorded in a media file. The handheld recording devices are also capable of capable of receiving a media file; extracting markup from the media file; rendering supplemental content in dependence upon the markup; and playing the audio portion of the media file.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Asynchronous communications in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary library management system (104) useful in asynchronous communications according to embodiments of the present invention. The library management system (104) of FIG. 2 includes at least one computer processor (156) or 'CPU' as well as random access memory (168) ('RAM') which is connected through a system bus (160) to processor (156) and to other components of the library management system.

Stored in RAM (168) is a library management application (202) for asynchronous communications according to the present invention including computer program instructions for receiving a recorded message, the message recorded on a handheld device; converting the recorded message to text; identifying a recipient of the message in dependence upon the text; associating the message with content under management by a library management system in dependence upon the text; and storing the message for transmission to another handheld device for the recipient.

Figure 2:
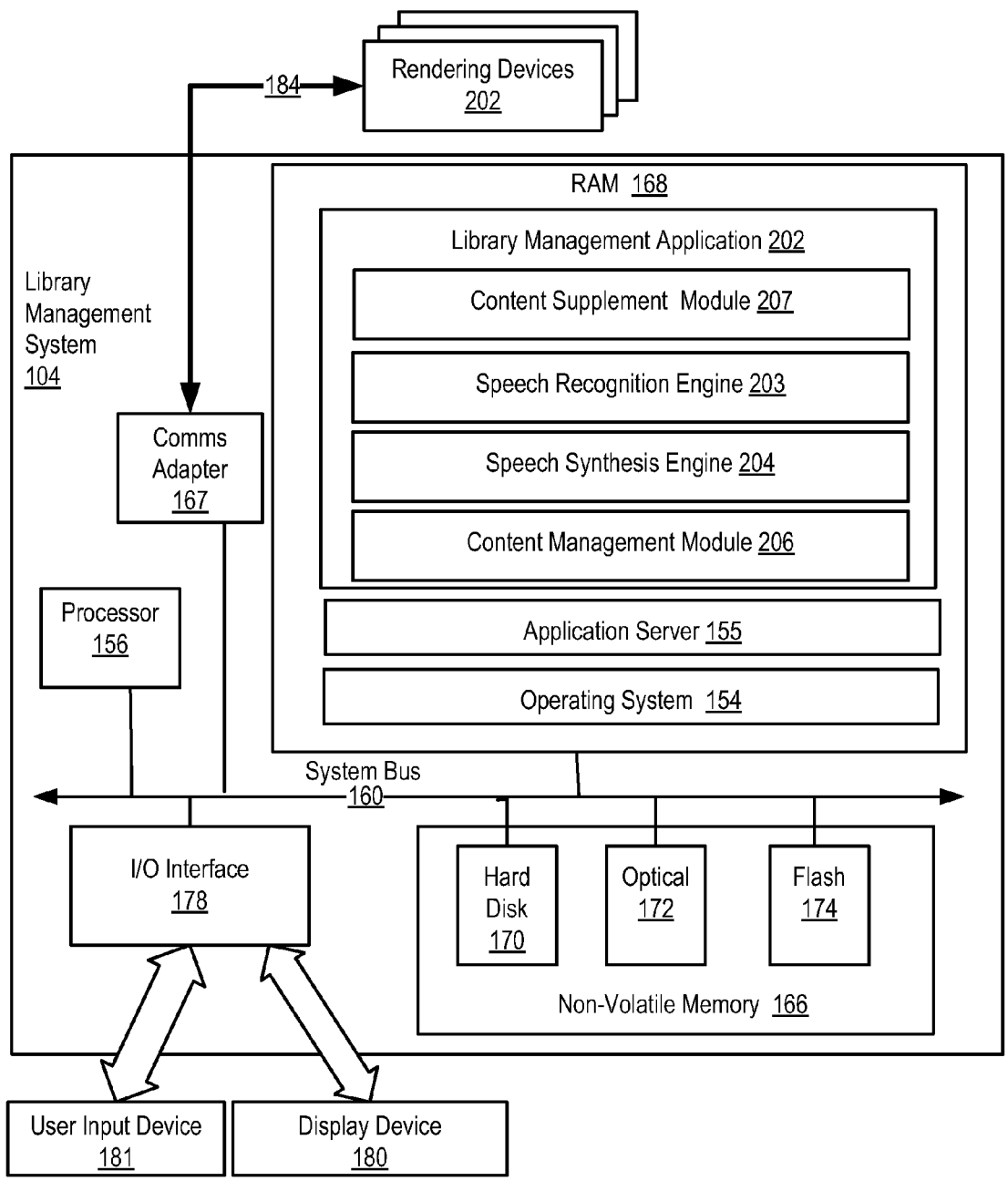
FIG. 2 sets forth a block diagram of automated computing machinery comprising an exemplary library management system useful in asynchronous communications according to embodiments of the present invention.

The library management application (202) of FIG. 2 includes a speech recognition engine (203), computer program instructions for converting a recorded message to text. Examples of speech recognition engines capable of modification for use with library management applications according to the present invention include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The library management application (202) of FIG. 2 includes a speech synthesis engine (204), computer program instructions for creating speech identifying the content associated with the message. Examples of speech engines capable of creating speech identifying the content associated with the message, for example, IBM's ViaVoice Text-to-Speech, Acapela Multimedia TTS, AT&T Natural Voices™ Text-to-Speech Engine, and Python's pyTTS class.

The library management application (202) of FIG. 2 includes a content management module (206), computer program instructions for receiving a recorded message; identifying a recipient of the message in dependence upon text converted from the message; associating the message with content under management by a library management system in dependence upon the text; and storing the message for transmission to another handheld device for the recipient.

The library management application (202) of FIG. 2 also includes a content supplement module (207), computer program instructions for supplementing audio recorded in a media file. The content supplement module includes computer program instructions capable of receiving a media file; identifying the subject matter of audio portion of the media file; identifying supplemental content for supplementing the subject matter recorded in the audio portion of the media file; and inserting in the media file markup for rendering the supplemental content.

Also stored in RAM (168) is an application server (155), a software platform that provides services and infrastructure required to develop and deploy business logic necessary to provide web clients with access to enterprise information systems. Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) and library management module (202) in the example of FIG. 2 are shown in RAM (168), but many components of such software typically are stored in non-volatile memory (166) also.

Library management system (104) of FIG. 2 includes non-volatile computer memory (166) coupled through a system bus (160) to processor (156) and to other components of the library management system (104). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary library management system of FIG. 2 includes one or more input/output interface adapters (178). Input/output interface adapters in library management systems implement user-oriented input/output through, for example, software drivers and computer hardware for controlling output to display devices (180) such as computer display screens, as well as user input from user input devices (181) such as keyboards and mice.

The exemplary library management system (104) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for asynchronous communications and supplementing audio according to embodiments of the present invention include modems for wired dial-up communications, Ethernet (IEEE 802.3) adapters for wired network communications, and 802.11b adapters for wireless network communications.

Asynchronous Communications

Figure 3:
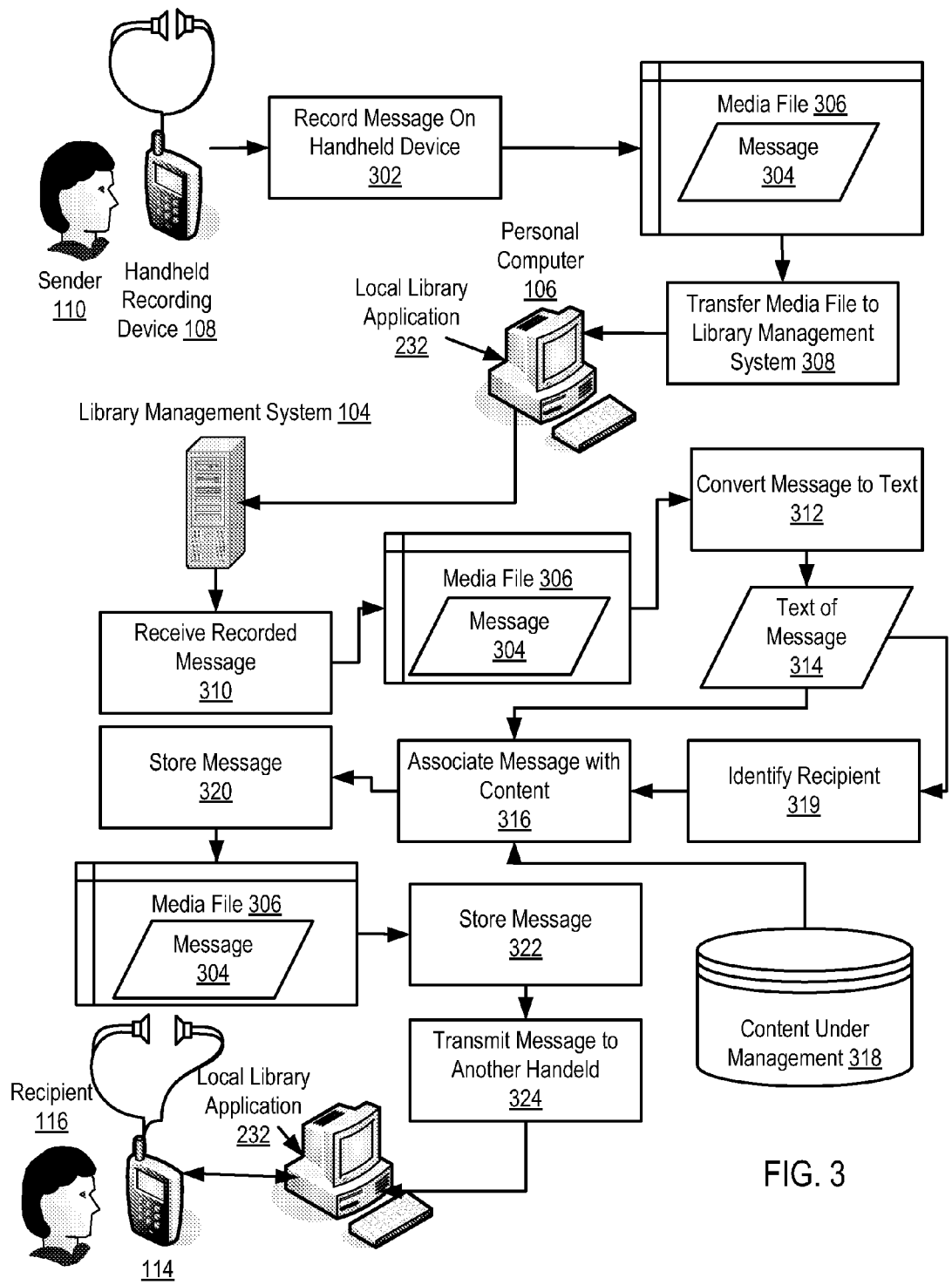
FIG. 3 sets forth a flow chart illustrating an exemplary method for asynchronous communications according to embodiments of the present invention.

For further explanation, FIG. 3 sets forth a flow chart illustrating an exemplary method for asynchronous communications according to embodiments of the present invention that includes recording (302) a message (304) on handheld device (108). Recording (302) a message (304) on handheld device (108) may be carried out by recording a message in the data format the handheld device supports. Examples of media files useful in asynchronous communications according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 3 includes transferring (308) a media file (306) containing the recorded message (304) to a library management system (104). As discussed above, one way of transferring (308) a media file (306) containing the recorded message (304) to a library management system (104) includes synchronizing the handheld recording device (108) with a local library application (232) which in turns uploads the media file to the local management system (104). Synchronizing the handheld recording device (108) with a local library application (232) may provide a sender to record messages at the sender's convenience and also the sender to initiate the sending of those messages at the sender's convenience.

The method of FIG. 3 also includes receiving (310) the recorded message (304). In the example of FIG. 3, a library management system (104) receives the recorded message in a media file from a local library application (232). Local library applications (232) according to the present invention may be configured to upload messages from a sender to a library management system (104) and download messages for a recipient from a library management system (104) periodically, such as daily, hourly and so on, upon synchronization with handheld recording devices, or in any other manner as will occur to those of skill in the art.

The method of FIG. 3 also includes converting (312) the recorded message (304) to text (314). Converting (312) the recorded message (304) to text (314) may be carried out by a speech recognition engine. Speech recognition is the process of converting a speech signal to a set of words, by means of an algorithm implemented as a computer program. Different types of speech recognition engines currently exist. Isolated-word speech recognition systems, for example, require the speaker to pause briefly between words, whereas a continuous speech recognition systems do not. Furthermore, some speech recognition systems require a user to provide samples of his or her own speech before using them, whereas other systems are said to be speaker-independent and do not require a user to provide samples.

To accommodate larger vocabularies, speech recognition engines use language models or artificial grammars to restrict the combination of words and increase accuracy. The simplest language model can be specified as a finite-state network, where the permissible words following each word are explicitly given. More general language models approximating natural language are specified in terms of a context-sensitive grammar.

Examples of commercial speech recognition engines currently available include SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

The method of FIG. 3 also includes identifying (319) a recipient (116) of the message (304) in dependence upon the text (314). Identifying (319) a recipient (116) of the message (304) in dependence upon the text (314) may be carried out by scanning the text for previously identified names or user identifications. Upon finding a match, identifying (319) a recipient (116) of the message (304) may be carried out by retrieving a user profile for the identified recipient including information facilitating sending the message to the recipient.

The method of FIG. 3 also includes associating (316) the message (304) with content (318) under management by a library management system in dependence upon the text (314). Associating (316) the message (304) with content (318) under management by a library management system in dependence upon the text (314) may be carried out by creating speech identifying the content associated with the message; and associating the speech with the recorded message for transmission with the recorded message as discussed below with reference to FIG. 4. Associating (316) the message (304) with content (318) under management by a library management system in dependence upon the text (314) may also be carried out by extracting keywords from the text; and searching content under management for the keywords as discussed below with reference to FIG. 5. Associating (316) the message (304) with content (318) under management by a library management system in dependence upon the text (314) may also be carried out by extracting an explicit identification of the associated content from the text; and searching content under management for the identified content as discussed below with reference with FIG. 6.

The method of FIG. 3 also includes storing (320) the message (304) for transmission to another handheld device (114) for the recipient (116). In the example of FIG. 3, a library management system (104) stores the message for downloading to local library application (232) for the recipient.

The method of FIG. 3 also includes transmitting (324) the message (304) to another handheld device (114). Transmitting (324) the message (304) to another handheld device (114) according to the method of FIG. 3 may be carried out by downloading the message to a local library application (232) for the recipient (116) and synchronizing the handheld recording device (114) with the local library application (232). Local library applications (232) according to the present invention may be configured to download messages for a recipient from a library management system (104) periodically, such as daily, hourly and so on, upon synchronization with handheld recording devices, or in any other manner as will occur to those of skill in the art.

To aid users in communication, content identified as associated with communications among users may be identified, described in speech, and presented to those users thereby seamlessly supplementing the existing communications among the users. For further explanation, FIG. 4 sets forth a flow chart illustrating an exemplary method for associating (316) the message (304) with content (318) under management by a library management system in dependence upon the text (314). The method of FIG. 4 includes creating (408) speech (412) identifying the content (318) associated with the message (304). Creating (408) speech (412) identifying the content (318) associated with the message (304) may be carried out by processing the text using a text-to-speech engine in order to produce a speech presentation of the text and then recording the speech produced by the text-speech-engine in the audio portion of a media file. Examples of speech engines capable of converting text to speech for recording in the audio portion of a media file include, for example, IBM's ViaVoice Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses for periodic sounds and generates noise for aspiration. Formant synthesis often generates highly intelligible, but not completely natural sounding speech. However, formant synthesis typically has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they often have the highest potential for sounding like natural speech, but concatenative systems typically require large amounts of database storage for the voice database.

Figure 4:
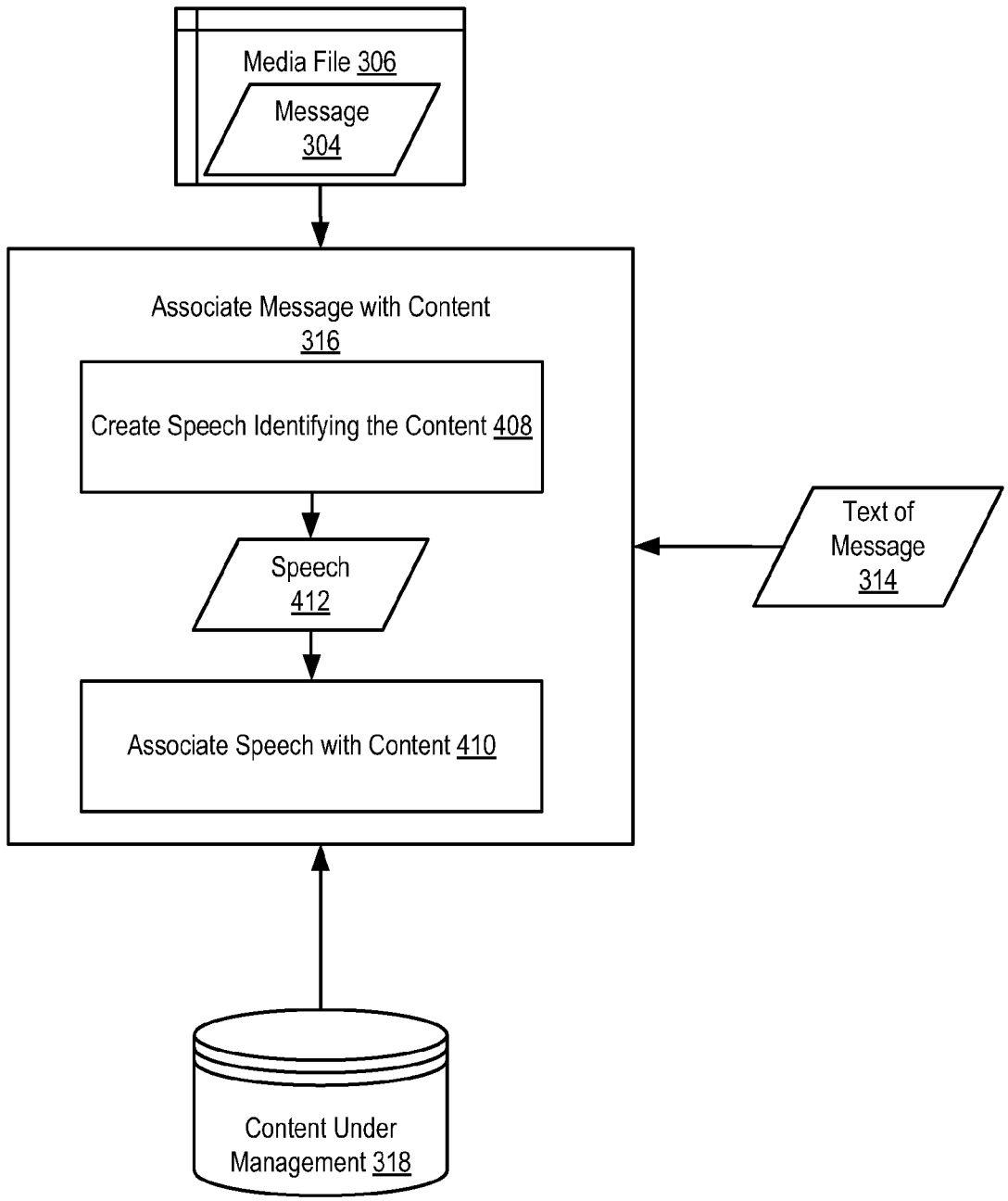
FIG. 4 sets forth a flow chart illustrating an exemplary method for associating the message with content under management by a library management system in dependence upon the text converted from a recorded message.

The method of FIG. 4 also includes associating (410) the speech (412) with the recorded message (304) for transmission with the recorded message (304). Associating (410) the speech (412) with the recorded message (304) for transmission with the recorded message (304) may be carried out by including the speech in the same media file as the recoded message, creating a new media file containing both the recorded message and the created speech, or any other method of associating the speech with the recorded message as will occur to those of skill in the art.

As discussed above, associated messages with content under management often requires identifying the content. For further explanation, FIG. 5 sets forth a flow chart illustrating another method for associating (316) the message (304) with content (318) under management by a library management system in dependence upon the text (314). The method of FIG. 5 includes extracting (402) keywords (403) from the text (314). Extracting (402) keywords (403) from the text (314) may be carried out by extracting words from the text that elicit information about content associated with the subject matter of the message such as, for example, 'politics,' 'work,' 'movies,' and so. Extracting (402) keywords (403) from the text (314) also may be carried out by extracting words from the text identifying types of content such as, for example, 'email,' 'file,' 'presentation,' and so on. Extracting (402) keywords (403) from the text (314) also may be carried out by extracting words from the text having temporal semantics, such as 'yesterday,' 'Monday,' '10:00 am.' and so on. The examples of extracting words indicative of subject matter, content type, or temporal semantics are presented for explanation and not for limitation. In fact, associating (316) the message (304) with content (318) under management by a library management system in dependence upon the text (314) may be carried out in many was as will occur to those of skill in the art and all such ways are within the scope of the present invention.

Figure 5:
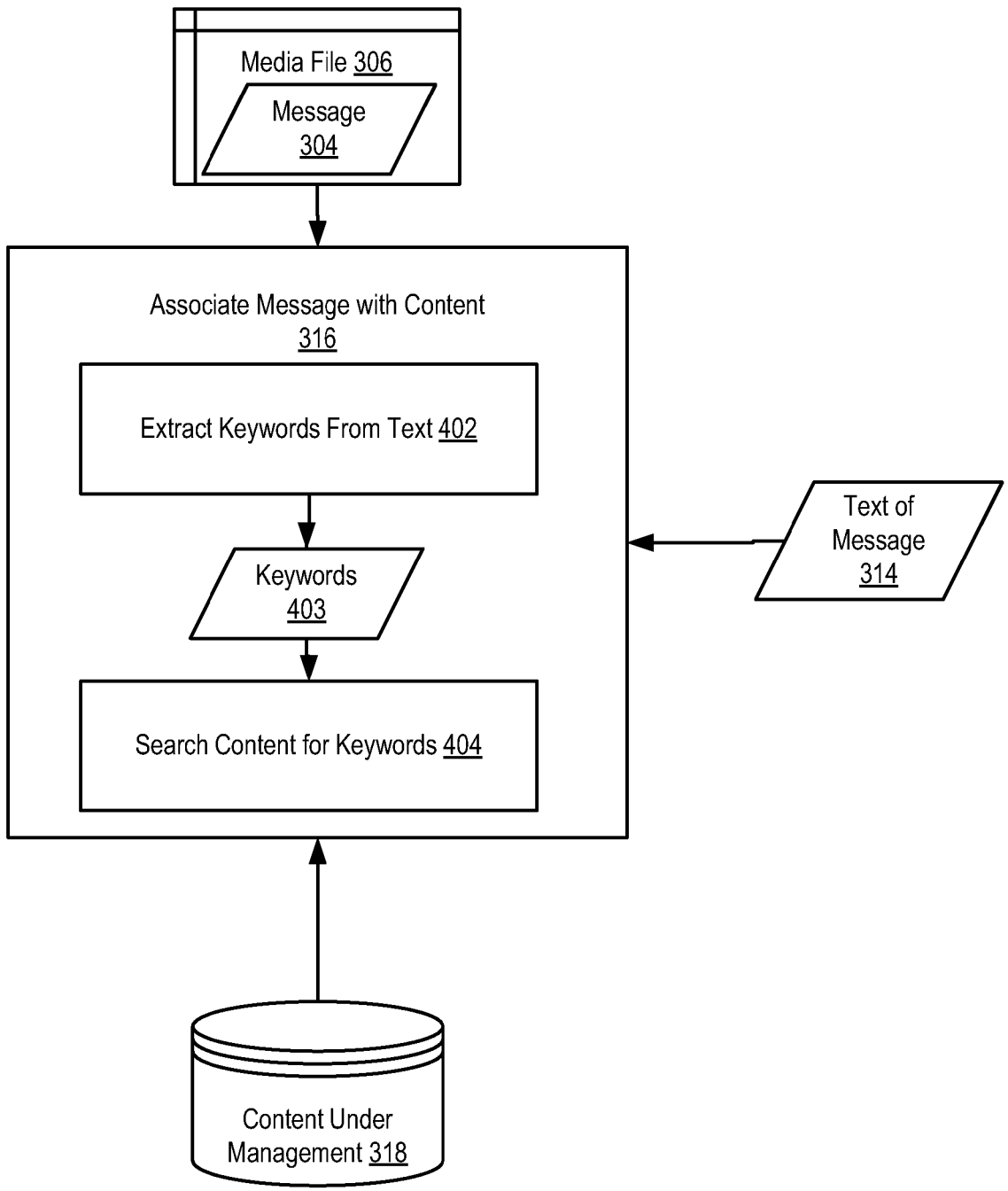
FIG. 5 sets forth a flow chart illustrating another method for associating the message with content under management by a library management system in dependence upon the text converted from a recorded message.
Figure 6:
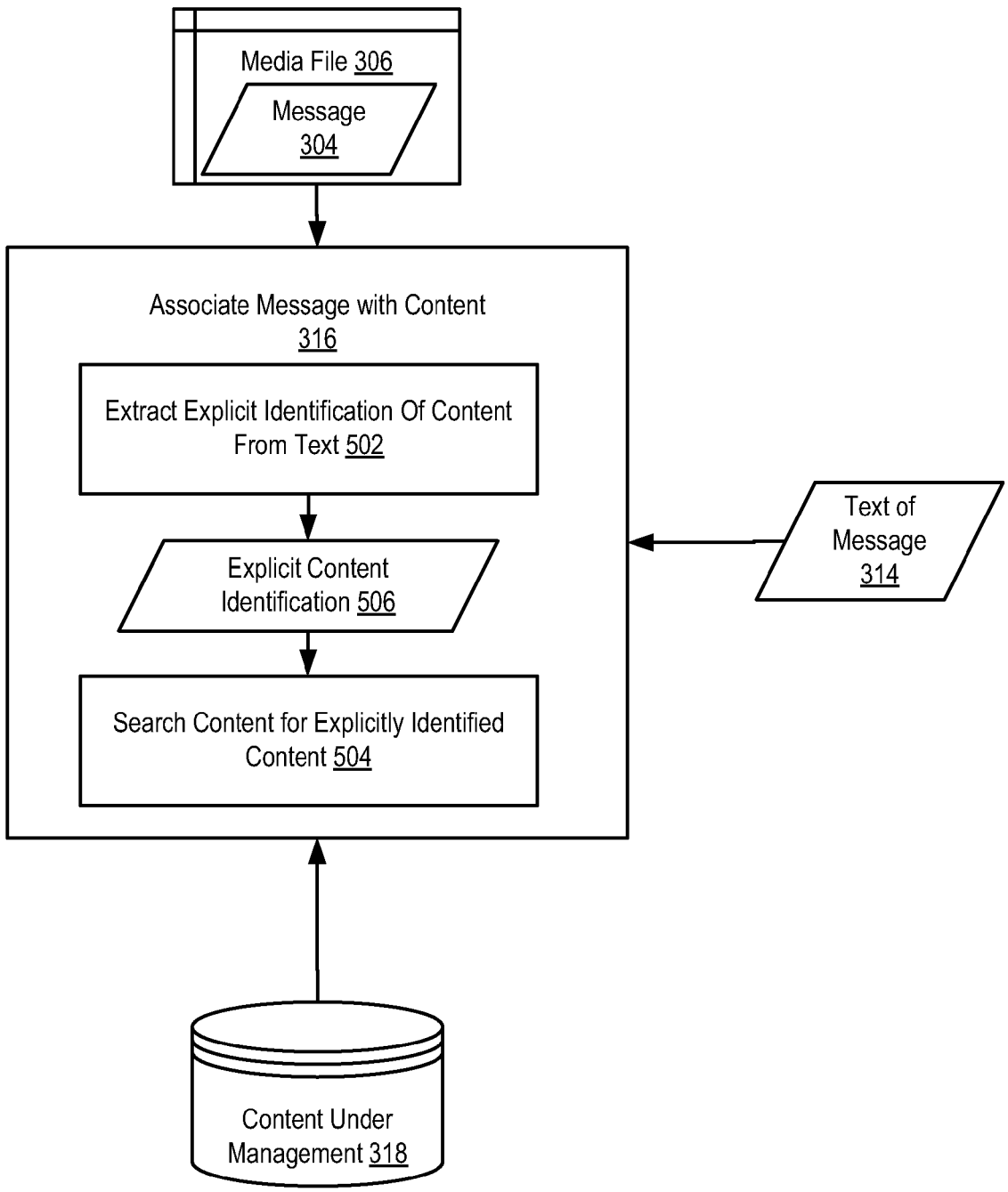
FIG. 6 sets forth a flow chart illustrating another method for associating the message with content under management by a library management system in dependence upon the text converted from a recorded message.

The method of FIG. 5 also includes searching (404) content (318) under management for the keywords (403). Searching (404) content (318) under management for the keywords (403) may be carried out by searching the titles, metadata, and content itself for the keywords and identifying as a match content having the most matching keywords or content having the best matching keywords according to predefined algorithms for selecting matching content from potential matches.

In some cases, the messages comprising communications among users may contain an explicit identification of content under management. For further explanation, FIG. 6 sets forth a flow chart illustrating another method for associating (316) the message (304) with content (318) under management by a library management system in dependence upon the text (314) includes extracting (502) an explicit identification (506) of the associated content from the text and searching content (318) under management for the identified content (506). Extracting (502) an explicit identification (506) of the associated content from the text may be carried out by identifying one or more words in the text matching a title or closely matching a title or metadata identification of specific content under management. For example, the phrase 'the Jones Presentation,' may be extracted as an explicit identification of a PowerPoint™ Presentation entitled 'Jones Presentation May 2, 2006.' For example, the phrase 'Your message of Yesterday,' may be extracted as an explicit identification of a message from the intended recipient of the message send a day earlier than the current message from which the text was converted according to the present invention.

Supplementing Audio Recorded in a Media File

Figure 7:
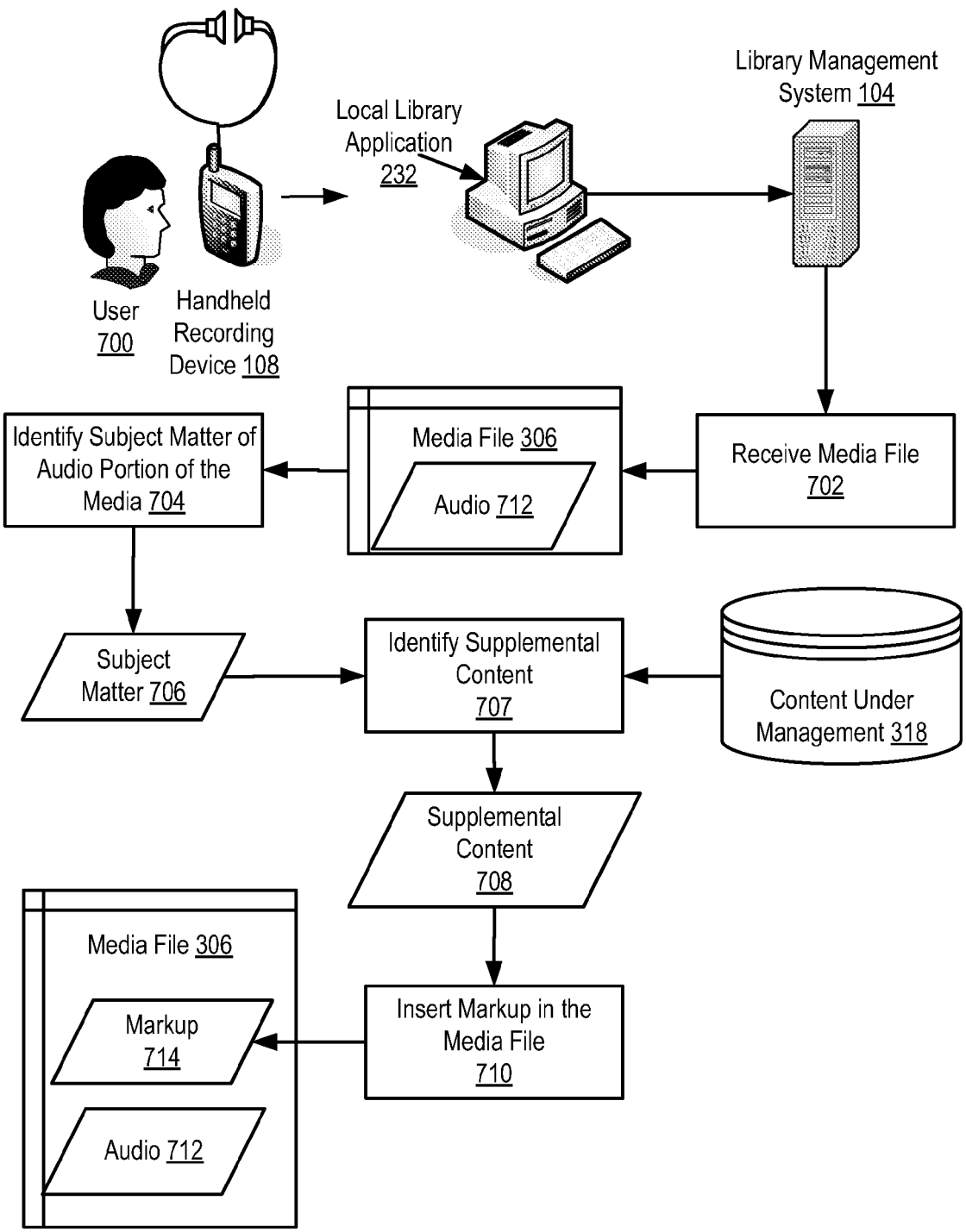
FIG. 7 sets forth a flow chart illustrating an exemplary method for supplementing audio recorded in a media file.

As mentioned above, the content of messages stored in audio portion of media files for asynchronous communications and other content stored in the audio portion of a media file may be supplemented to provide additional information and often added enjoyment for a user. For further explanation, therefore, FIG. 7 sets forth a flow chart illustrating an exemplary method for supplementing audio recorded in a media file. The method of FIG. 7 includes receiving (702) a media file (306). In the example of FIG. 7, the media file (306) is received in a library management system (104). Receiving (702) a media file (306) may be carried out by synchronizing a handheld recording device (108) with a local library application (232) which in turns uploads the media file to the local management system (104). Receiving (702) a media file (306) may also be carried out by transmitting the media file to the library management system from another server through, for example, purchase or transfer, or another computer as will occur to those of skill in the art.

The exemplary media file of FIG. 7 has content stored in the audio portion (712) of the media file. The content stored in the media file may be messages recorded by users for asynchronous communications, content such as songs, speech recordings, and other content as will occur to those of skill in the art. Examples of media files useful in supplementing audio recorded in a media file according to the present invention include MPEG 3 ('.mp3') files, MPEG 4 ('.mp4') files, Advanced Audio Coding ('AAC') compressed files, Advances Streaming Format ('ASF') Files, WAV files, and many others as will occur to those of skill in the art.

The method of FIG. 7 also includes identifying (704) the subject matter of audio portion (712) of the media file (306). Identifying (704) the subject matter of audio portion (712) of the media file (306) may be carried out by retrieving an identification of the subject matter of the media file stored as metadata in a header of the media file. For example, in an MPEG file, such a header may be an ID3v2 tag designed to store metadata about the content on the media file. An ID3v2 tag is prepended to the audio portion of the media file. An ID3v2 tag provides a container for metadata associated with the media file. An ID3v2 tag includes one or more fames supporting the inclusion of text, images, files, and other information. ID3v2 tags are flexible and expandable because parsers that do not support specific functions of the ID3v2 tag will ignore those functions. ID3v2 supports Unicode thereby providing the ability to include metadata in text of many different languages. The maximum tag size of an ID3v2 tag is typically 256 megabytes and maximum frame size is typically 16 megabytes.

Identifying (704) the subject matter of audio portion (712) of the media file (306) may be also carried out by converting the audio portion to text and determining a subject matter from the text. As discussed above, converting the audio portion to text may be carried out by a speech recognition engine such as, for example, SpeechWorks available from Nuance Communications, Dragon NaturallySpeaking also available from Nuance Communications, ViaVoice available from IBM®, Speech Magic available from Philips Speech Recognition Systems, iListen from MacSpeech, Inc., and others as will occur to those of skill in the art.

Determining a subject matter from the text may be carried out by parsing the text in dependence upon rules predetermined to identify words indicative of the subject matter of the content recorded on the audio portion of the media file. Such rules may for example ignore commonly used words such as 'a,' 'the,' 'and' and so on and then use a weighted algorithm to extract words that may be used to determine the subject matter of the content recorded on the audio portion of the media file.

The method of FIG. 7 also includes identifying (707) supplemental content (708) for supplementing the subject matter recorded in the audio portion (712) of the media file (306). Identifying (707) supplemental content (708) for supplementing the subject matter recorded in the audio portion (712) of the media file (306) may be carried out by retrieving markup from a database (318) that is indexed by subject matter. Such markup when rendered by browser provides additional content for supplementing the recorded audio portion of a media file.

The markup may include markup for visual rendering by a browser such as, for example, HyperText Markup Language ('HTML'). The markup may also include voice markup to be rendered by a multimodal browser such as for example VoiceXML, X+V ('XHTML plus Voice') and so on as will occur to those of skill in the art.

The method of FIG. 7 also includes inserting (710) in the media file (306) markup for rendering the supplemental content (708). Inserting (710) in the media file (306) the markup for rendering the supplemental content (708) may be carried out by including the markup in a header in the media file. For example, markup may be included in an ID3v2 tag of an MPEG media file.

Having included the markup for supplementing the content recorded in the audio portion of the media file, the markup may now be rendered to supplement in real time the audio played on a handheld recording device. For further explanation, therefore, FIG. 8 sets forth a flow chart illustrating further aspects of some embodiments of supplementing audio recorded in a media file according to the present invention. The method of FIG. 8 includes receiving (802) the media file (306). Receiving (802) the media file (306) may be carried out by downloading the media file from a library management system (104) to a local library application (232) for the user (700) and synchronizing the handheld recording device (108) with the local library application (232). Local library applications (232) according to the present invention may be configured to download media files from the library management system (104) periodically, such as daily, hourly and so on, upon synchronization with handheld recording devices, or in any other manner as will occur to those of skill in the art.

Figure 8:
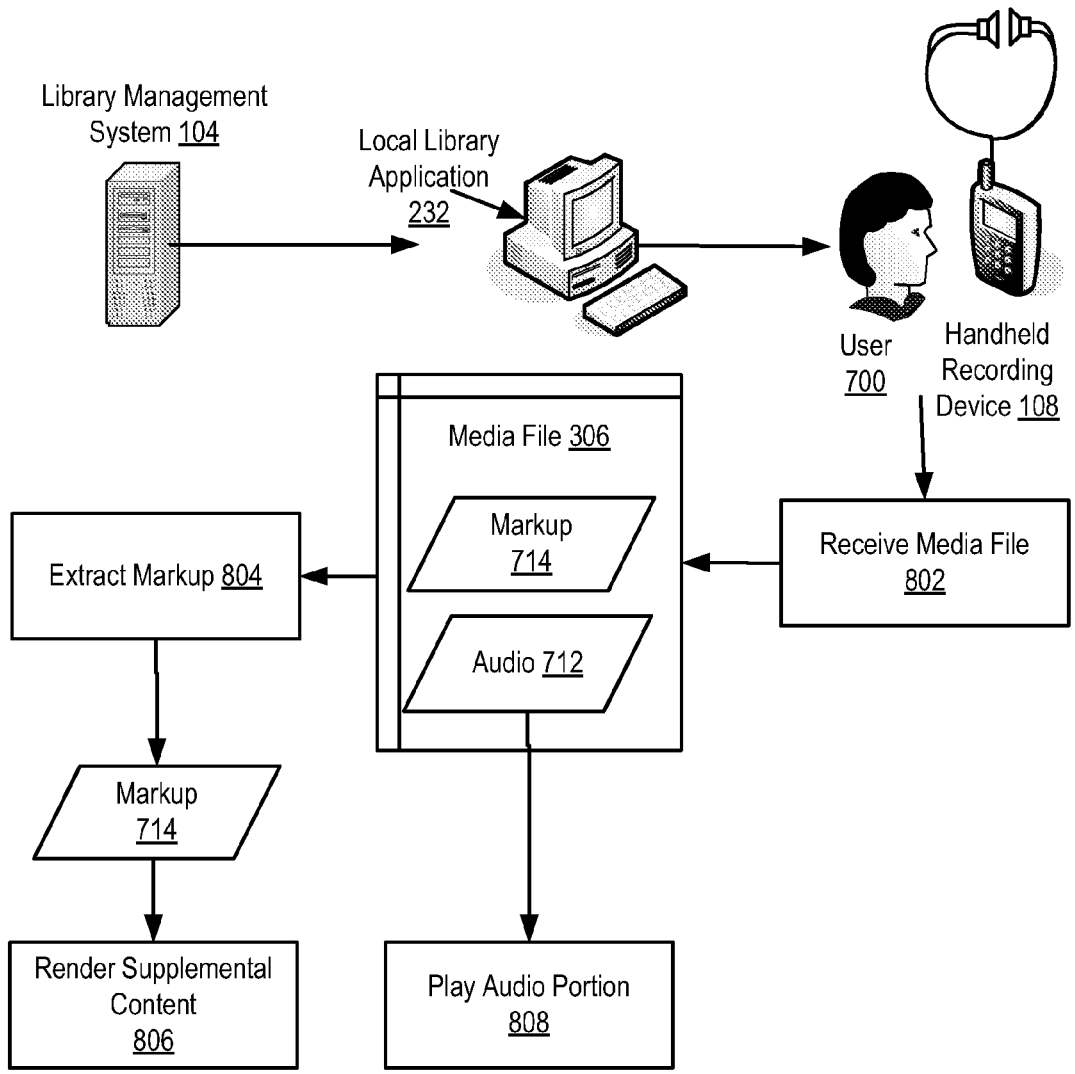
FIG. 8 sets forth a flow chart illustrating further device-side aspects of embodiments of supplementing audio recorded in a media file according to the present invention.

The method of FIG. 8 also includes extracting (804) markup (714) from the media file (306). Extracting (804) markup (714) from the media file (306) may be carried out by extracting markup from an ID3v2 tag in, for example, an MPEG media file.

The method of FIG. 8 also includes rendering (806) supplemental content in dependence upon the markup (714) and playing (808) the audio portion (712) of the media file (306). Rendering (806) supplemental content in dependence upon the markup (714) may be carried out by rendering the supplemental content on a browser installed on a handheld recording device. Similarly, playing (808) the audio portion (712) of the media file (306) may be carried out by playing the audio portion of a media file by a handheld recording device.

For improved user experience, the supplemental content may be rendered synchronized with the playback of the content on the media file. For example, the timing of content rendered according to the markup on the browser may be timed according to duration of the audio recorded on the media file. In some embodiments of the method of FIG. 8, therefore, extracting markup from the media file includes extracting synchronization markup from the media file. Synchronization markup is markup dictating to a browser timing information for synchronizing supplemental content with the playback of the media file. In such embodiments, rendering supplemental content in dependence upon the markup is carried out by synchronizing the rendering of the supplemental content with the playing of the audio portion of the media file in dependence upon the synchronization markup.

Exemplary embodiments of the present invention are described largely in the context of a fully functional computer system for asynchronous communications using messages recorded on handheld devices and supplementing audio recorded in a media file. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for supplementing audio recorded in a media file, the method comprising:
   receiving a media file;
   extracting keywords from text of an audio portion of the media file, and determining a subject matter from text based on the keywords;
   identifying, from the audio portion of the media file, the subject matter of the audio portion of the media file;
   searching a content source for supplemental content, wherein the content source is a managed library comprising a database indexed by subject matter, wherein the supplemental content relates to and supplements the identified subject matter of the audio portion of the media file;
   identifying, automatically without user intervention, the supplemental content for supplementing the subject matter recorded in the audio portion of the media file;
   inserting, in the media file, markup for rendering the supplemental content, wherein the supplemental content comprises one or more image files, video files or text files; and
   rendering supplemental content in dependence upon the markup.

2. The method of claim 1 wherein identifying the subject matter of audio portion of the media file further comprises converting the audio portion to text.

3. The method of claim 1 further comprising:
   extracting the markup from the media file including extracting synchronization markup from the media file; and
   wherein the rendering supplemental content in dependence upon the markup includes synchronizing the rendering of the supplemental content with the playing of the audio portion of the media file in dependence upon the synchronization markup.

4. The method of claim 1 further comprising:
   rendering supplemental content in dependence upon the markup including rendering the supplemental content on a browser installed on a handheld recording device; and
   playing the audio portion of the media file including playing the audio portion of a media file by the handheld recording device.

5. The method of claim 1 wherein the audio portion of the media file contains speech recorded on a handheld recording device for asynchronous communications between users.

6. The method of claim 1, the method further comprising:
   receiving the media file;
   extracting the markup from the media file;
   searching the database for database markup that matches the markup from the media file, the database markup being associated with said supplemental content from the database;
   retrieving the database markup and said supplemental content from said database;
   rendering the supplemental content in dependence upon the markup and the database markup; and
   playing the audio portion of the media file.

7. A system for supplementing audio recorded in a media file, the system comprising a computer processor, a computer memory operatively coupled to the computer processor, the computer memory having disposed within it computer program instructions, wherein the processor, upon executing the computer program instructions, is capable of:

receiving a media file;
extracting keywords from text of an audio portion of the media file, and determining a subject matter from text based on the keywords;
identifying, from the audio portion of the media file, the subject matter of audio portion of the media file;
searching a content source for supplemental content, wherein the content source is a managed library comprising a database indexed by subject matter, wherein the supplemental content relates to and supplements the identified subject matter of the audio portion of the media file;
identifying, automatically without user intervention, the supplemental content for supplementing the subject matter recorded in the audio portion of the media file;
inserting, in the media file, markup for rendering the supplemental content, wherein the supplemental content comprises one or more image files, video files or text files; and
rendering supplemental content in dependence upon the markup.

8. The system of claim 7 wherein identifying the subject matter of audio portion of the media file further comprises converting the audio portion to text.

9. The system of claim 7 wherein the processor is capable of:
extracting the markup from the media file including extracting synchronization markup from the media file; and
wherein the rendering supplemental content in dependence upon the markup includes synchronizing the rendering of the supplemental content with the playing of the audio portion of the media file in dependence upon the synchronization markup.

10. The system of claim 7 wherein the processor is capable of:
rendering supplemental content in dependence upon the markup including rendering the supplemental content on a browser installed on a handheld recording device; and
playing the audio portion of the media file including playing the audio portion of a media file by the handheld recording device.

11. The system of claim 7 wherein the audio portion of the media file contains speech recorded on a handheld recording device for asynchronous communications between users.

12. The system of claim 7, the system further comprising another computer processor, another computer memory operatively coupled to the another computer processor, the another computer memory having disposed within it other computer program instructions, wherein the another computer processor, upon executing the other computer program instructions, is capable of:
receiving the media file;
extracting the markup from the media file;
searching the database for any database markup that matches the markup from the media file, the database markup being associated with said supplemental content from the database;
retrieving the database markup and said supplemental content from said database;
rendering the supplemental content in dependence upon the markup and the database markup; and
playing the audio portion of the media file.

13. A computer program product for supplementing audio recorded in a media file, the computer program product embodied on a non-transitory computer-readable recordable medium, the computer program product comprising:
computer program instructions for receiving a media file;
computer program instructions for extracting keywords from text of an audio portion of the media file, and determining a subject matter from text based on the keywords;
computer program instructions for identifying, from the audio portion of the media file, the subject matter of audio portion of the media file;
computer program instructions for searching a content source for supplemental content, wherein the content source is a managed library comprising a database indexed by subject matter, wherein the supplemental content relates to and supplements the identified subject matter of the audio portion of the media file;
computer program instructions for identifying, automatically without user intervention, supplemental content for supplementing the subject matter recorded in the audio portion of the media file;
computer program instructions for inserting, in the media file, markup for rendering the supplemental content, wherein the supplemental content comprises one or more image files, video files or text files; and
rendering supplemental content in dependence upon the markup.

14. The computer program product of claim 13 wherein computer program instructions for identifying the subject matter of audio portion of the media file further comprise computer program instructions for converting the audio portion to text.

15. The computer program product of claim 13 further comprising:
computer program instructions for extracting the markup from the media file including computer program instructions for extracting synchronization markup from the media file; and
wherein the computer program instructions for rendering supplemental content in dependence upon the markup includes computer program instructions for synchronizing the rendering of the supplemental content with the playing of the audio portion of the media file in dependence upon the synchronization markup.

16. The computer program product of claim 13 further comprising:
computer program instructions for rendering supplemental content in dependence upon the markup including computer program instructions for rendering the supplemental content on a browser installed on a handheld recording device; and
computer program instructions for playing the audio portion of the media file including computer program instructions for playing the audio portion of a media file by the handheld recording device.

17. The computer program product of claim 13 wherein the audio portion of the media file contains speech recorded on a handheld recording device for asynchronous communications between users.

18. The computer program product of claim 13, the computer program product further comprising:
computer program instructions for receiving the media file;
computer program instructions for extracting the markup from the media file;
computer program instructions for searching the database for any database markup that matches the markup from the media file, the database markup being associated with said supplemental content from the database;

computer program instructions for retrieving the database markup and said supplemental content from said database;

computer program instructions for rendering supplemental content in dependence upon the markup and the database markup; and computer program instructions for playing the audio portion of the media file.

19. The method of claim 1, wherein the audio portion of the media file is a voice message recorded on a handheld device configured to communicate over a wireless network.

20. The system of claim 7, wherein the audio portion of the media file is a voice message recorded on a handheld device configured to communicate over a wireless network.

21. The computer program product of claim 13, wherein the audio portion of the media file is a voice message recorded on a handheld device configured to communicate over a wireless network.

\* \* \* \* \*